April 11, 1939.  L. BRANDENBURGER  2,154,260
ELECTRONIC METERING SYSTEM
Filed March 5, 1936
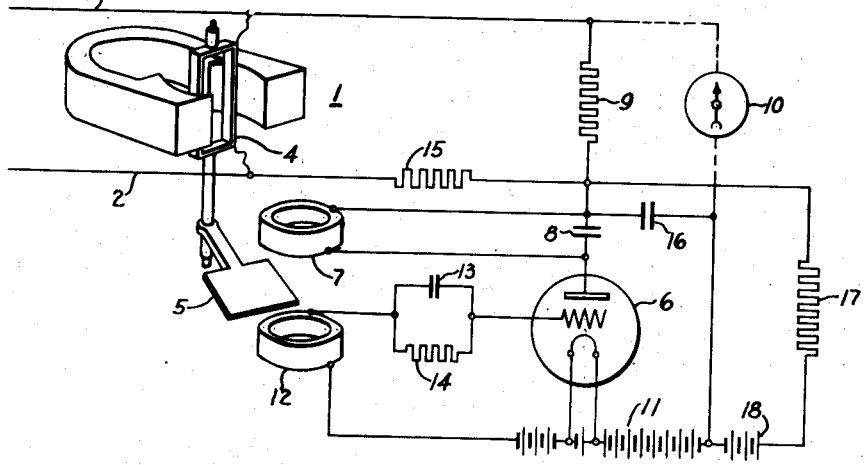
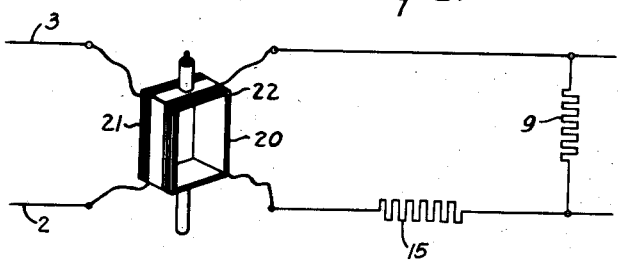
WITNESSES:
Michael Stark
Geo. O. Harrison
INVENTOR
Leo Brandenburger
BY 
ATTORNEY Patented Apr. 11, 1939

2,154,260

UNITED STATES PATENT OFFICE 2,154,260

ELECTRONIC METERING SYSTEM

Leo Brandenburger, Falkensee, Kreis Ost-Havelland, Germany, assignor to Westinghouse Electric & Manufacturing Company, East Pittsburgh, Pa., a corporation of Pennsylvania Application March 5, 1936, Serial No. 67,411
In Germany May 12, 1934

6 Claims. (Cl. 177—351)

My invention relates to measuring and recording systems and similar apparatus of the class in which a translating device, operating at a comparatively high energy level, is accurately controlled in response to a variable of low power magnitude. Although the invention in its broader aspects is applicable to many forms of apparatus, it will be considered by way of example as applied to electrical measuring systems of the type in which a comparatively heavy current for operating indicating or recording devices is held at a fixed ratio with reference to a comparatively feeble control current or voltage, by means of a translating device capable of varying the heavy current.

In such apparatus as heretofore devised to my knowledge, the translating device for controlling the heavy current is provided with a movable element subject to mechanical forces developed at least partially from the control current or voltage. As the amount of power available from this source is small, the mechanical reaction of the movable element, which may be caused by friction, electromagnetic forces or other effects, represents a large portion of the total force acting on the movable element, and the sensitivity and accuracy of the system are correspondingly diminished.

It is an object of my invention to provide a novel system of the type indicated above, in which the mechanical reaction of the movable element will be substantially eliminated by means of a novel application of electronic apparatus.

Other objects of my invention will become evident from the following detailed description taken in conjunction with the accompanying drawing, in which:

Figure 1 is a diagrammatic view of an electrical metering system embodying my invention, and Fig. 2 is a fragmentary diagrammatic view of a modification of the system shown in Fig. 1.

Referring to Fig. 1, in detail, a motive device of any suitable type capable of translating the control variable to a force or torque, shown as a moving coil instrument movement 1, is provided with a movable element 4 to which is attached a conducting vane 5 of aluminum or other suitable material. The moving coil 4 is connected to a pair of conductors 2 and 3 to be energized by a current or voltage proportional to the quantity to be measured. It will be understood that the conductors 2 and 3 may constitute a remote metering circuit or may be connected to some such device as a Wheatstone bridge or a thermocouple, depending upon the application of the invention.

The conducting vane 5 is arranged to control the coefficient of coupling of a regeneratively connected electronic device 6, which may be of any of a number of types known in the art, suitable for the generation of periodically varying currents. By way of illustration it will be assumed that the electronic device 6 is a triode of the hard or highly-exhausted hot-cathode type and is connected to operate as an oscillator. For this purpose, an oscillatory system consisting of an inductance coil 7 and a condenser 8 is connected in the plate circuit of the triode 6. The plate circuit of the triode 6 also includes a resistor 9 and an electrical measuring device 10, which may be an indicating or recording element. A B-source 11, of any suitable type, shown as a battery, is provided for supplying electromotive force in the plate circuit.

The inductance coil 7 is mounted in mutually inductive relationships with a second inductance coil 12, connected in the grid circuit of the triode 6, in such manner as to provide a regenerative coupling for the triode. The mutually inductive coils 7 and 12 are so positioned with reference to the path of movement of the vane 5 that the latter permits maximum flux interlinkage between the coils 7 and 12 when the current flow in the movable coil 4 is zero. If a current of proper polarity is circulated in the movable coil 4, however, the vane 5 moves to intercept a variable portion of the flux interlinking the coils 7 and 12, and to thereby decrease the coefficient of coupling of the grid and plate circuits.

A grid condenser 13 and grid resistor 14 are connected in the grid circuit of the triode 6 to control the accumulation of negative charge on the grid, in well known manner. The constants of the triode circuit are preferably so related that the circuit oscillates vigorously when the movable coil 4 is in its deenergized position. When the circuit is in this condition, the grid of the triode 6 carries a high average negative charge, and the direct-current component of plate current is at a minimum value.

The electro-mechanical translating device 1 is provided with some means for producing an effect, dependent upon an output characteristic of the triode 6, which tends to balance the effect produced by the current flowing in the conductors 2 and 3. This may be conveniently accomplished in the circuit shown in Fig. 1 by directly connecting the movable coil 4, in series with a resistor 15, to the plate circuit of the triode 6 in such manner that part of the plate current of the latter flows through the coil 4, in opposite direction to the current supplied by the conductors 2 and 3.

A condenser 16 is provided for shunting the alternating-current component of plate current of the triode 6 around the measuring device 10, in a manner well understood in the art.

In order to prevent a deflection of the measuring device 10 in response to the minimum current flow in the plate circuit of the triode 6 when the current supplied by the conductors 2 and 3 is zero, a battery 18 is provided for circulating a current component equal in magnitude to the minimum value mentioned above, in opposite direction to the direct component of plate current. A resistor 17 is provided for limiting the reverse current supplied by the battery 18 to the desired value.

The operation of the apparatus shown in Fig. 1 may be set forth as follows: If the current supplied by the conductors 2 and 3 is zero, the movable coil 4 and vane 5 remain in the position shown, so that the triode circuit oscillates to its maximum amplitude of output oscillations. The grid of the triode 6, under these conditions, immediately accumulates a negative charge which limits the direct component of plate current to a minimum value. As the battery 18 and resistor 17 are designed to neutralize this minimum value, the direct-current component of plate current is shunted away from the measuring device 10, and the indication of the latter remains zero.

If the control current supplied by the conductors 2 and 3 becomes of sufficient value to cause movement of the movable coil 4, the vane 5 is interposed between the inductance coils 7 and 12, and the amplitude of oscillations developed by the triode 6 is reduced. The average negative charge on the grid of triode 6 accordingly decreases and the direct-current component of plate current increases. As the direct-current component of plate current under these conditions exceeds the minimum value mentioned above, the measuring device 10 shows a finite reading. At the same time, the resistance coupling between the plate circuit of the triode 6 and the moving coil 4, established by resistors 9 and 15, causes a current component to flow in the coil 4 in a direction to restore its deflection to zero.

It will be seen that the moving coil 4 rotates to a position of equilibrium in which the current supplied by the conductors 2 and 3 is exactly neutralized by the component of triode plate current supplied to the coil 4. In such a position of equilibrium, the current flow in the coil 4 becomes zero and no force acts on the coil.

It will be noted that in the absence of spring bias or other mechanical forces on the moving coil 4, equilibrium occurs when the current supplied by the conductors 2 and 3 and the direct-current component of plate current of the triode 6 bear a fixed ratio, regardless of characteristics of the triode. It is accordingly desirable to eliminate external forces on the coil 4, so far as practicable by providing a mercury-gap or other anti-friction suspension for the coil 4. Stops should also be provided for limiting the angular movement of the coil 4. As such details are familiar to those skilled in the art, they have for simplicity been omitted from the drawing.

The circuit of the triode 6 may be designed to oscillate at any desired frequency in the audio or radio frequency range. Preferably, however, the circuit is designed to oscillate at frequencies of the order of $10^6$ cycles per second, as, at such frequencies the coils 7 and 12 may be of a convenient size, of the order of 1 x 1 x 5 cm.

It will be obvious that the circuit shown in Fig. 1 may be utilized as a sender for remote metering, where the receivers correspond to the device 10, or the entire apparatus may be utilized as a receiver if the conductors 2 and 3 are energized from a remote source. It will also be obvious that where the apparatus is used as a remote metering receiver, the sender may operate upon the impulse principle or upon any principle involving the transmission of direct-current energy.

In certain applications, as for example in totalizing metering systems, it is desirable to electrically separate the element which produces the initiating indication in response to the measured variable, from the element which produces the balancing or compensating effect. This, of course can be accomplished in a variety of ways, depending upon the nature of the measured variable. Fig. 2 shows one such arrangement, in which the movable armature 20, corresponding to the moving coil 4 of Fig. 1, is provided with two insulated coils, 21 and 22, connected respectively to the conductors 2 and 3 and to the triode circuit. The remainder of the circuit of Fig. 2 is similar to that of Fig. 1 and has been omitted.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In apparatus responsive to a variable condition, electronic means having an output circuit and an input circuit, an adjustable mutual impedance device regeneratively connecting said output circuit and said input circuit, and translating means for controlling said electronic means, said translating means including a system of impedances normally subject to balanced electrical conditions dependent upon said variable condition and an electrical condition of said output circuit, and electro-mechanical means responsive to an unbalanced electrical condition of said system of impedances for controlling the adjustment of said mutual impedance device.

2. In apparatus responsive to a variable condition, electronic means having an output circuit and an input circuit, an adjustable mutual impedance device regeneratively connecting said output circuit and said input circuit, and translating means for controlling said electronic means, said translating means including a system of impedances normally subject to balanced electrical conditions dependent upon said variable condition and an electrical condition of said output circuit, and electro-mechanical means responsive to an unbalanced electrical condition of said system of impedances for controlling the adjustment of said mutual impedance device.

3. In measuring apparatus responsive to a variable electrical condition, electronic means having an output circuit and an input circuit, an adjustable mutual impedance device regeneratively connecting said output circuit and said input circuit, and translating means for controlling said electronic means, said translating means including a system of impedances normally subject to balanced direct-current conditions dependent upon said variable condition and the direct-current component of current in said output circuit, and electro-mechanical means responsive to an unbalanced electrical condition of said system of impedance for controlling the adjustment of said mutual impedance device.

4. In measuring apparatus responsive to a variable electrical condition, electronic means having an output circuit and an input circuit, an inductive coupling device having mutually inductive coil portions regeneratively connecting said output circuit and said input circuit, and translating means for controlling said electronic means, said translating means including a system of impedances normally subject to balanced electrical conditions, dependent upon said variable conditions and an electrical condition of said output circuit, a conducting vane movable to vary the mutual inductance of said coil portions, and electro-mechanical means responsive to an electrical condition of said system of impedances for controlling the position of said conducting vane.

5. In measuring apparatus responsive to a direct-current electrical variable, an electronic oscillator having an output circuit and an input circuit, an inductive coupling device having mutually inductive coil portions regeneratively connecting said input circuit and said output circuit, a resistive impedance connected in said output circuit and transversed by the direct component of current thereof, a conducting vane movable to vary the mutual inductance of said coil portions, a direct-current instrument movement mechanically connected to said vane to control the position thereof, and means for applying opposing direct-current electrical quantities to said movement dependent upon said direct-current electrical variable and the resistance drop in said resistive impedance.

6. In measuring apparatus responsive to a direct-current electrical variable, an electronic oscillator having an output circuit and an input circuit, an inductive coupling device having mutually inductive coil portions regeneratively connecting said input circuit and said output circuit, a resistive impedance connected in said output circuit and traversed by the direct component of current thereof, a conducting vane movable to vary the mutual inductance of said coil portions, a direct-current instrument movement mechanically connected to said vane to control the position thereof, means for applying opposing direct-current electrical quantities to said movement dependent upon said direct-current electrical variable and the resistance drop in said resistive impedance, and means for neutralizing the effect of the minimum output current of said oscillator upon said resistive impedance.

LEO BRANDENBURGER.